(12) United States Patent
Jäger et al.

(10) Patent No.: US 9,417,113 B2
(45) Date of Patent: Aug. 16, 2016

(54) FILL LEVEL SENSOR FOR DETECTING THE FILL LEVEL OF A LIQUID IN A CONTAINER

(71) Applicants: Wighard Jäger, Spardorf (DE); Karl-Friedrich Pfeiffer, Erlangen (DE); Claus Weber, Fürth (DE)

(72) Inventors: Wighard Jäger, Spardorf (DE); Karl-Friedrich Pfeiffer, Erlangen (DE); Claus Weber, Fürth (DE)

(73) Assignee: Continental Automotive GmbH, Hannover (DE)

( * ) Notice: Subject to any disclaimer, the term of this patent is extended or adjusted under 35 U.S.C. 154(b) by 154 days.

(21) Appl. No.: 14/362,803

(22) PCT Filed: Dec. 6, 2012

(86) PCT No.: PCT/EP2012/074656
§ 371 (c)(1),
(2) Date: Jun. 4, 2014

(87) PCT Pub. No.: WO2013/083700
PCT Pub. Date: Jun. 13, 2013

(65) Prior Publication Data
US 2014/0338444 A1 Nov. 20, 2014

(30) Foreign Application Priority Data

Dec. 8, 2011 (DE) .......................... 10 2011 087 981

(51) Int. Cl.
*G01F 23/296* (2006.01)
*F16N 19/00* (2006.01)

(52) U.S. Cl.
CPC .......... *G01F 23/2962* (2013.01); *F16N 19/003* (2013.01)

(58) Field of Classification Search
CPC .. G01F 23/296; G01F 23/2962; F16N 19/003
See application file for complete search history.

(56) References Cited

U.S. PATENT DOCUMENTS 5,456,108 A * 10/1995 Birkett ................ G01F 23/2962
73/290 V
5,822,274 A * 10/1998 Haynie ................ G01F 23/2962
367/908

FOREIGN PATENT DOCUMENTS

DE     10 2009 023 211     12/2010
WO     WO 2008/009277      1/2008

* cited by examiner

*Primary Examiner* — Daniel S Larkin
*Assistant Examiner* — Alex Devito
(74) *Attorney, Agent, or Firm* — Cozen O'Connor

(57) ABSTRACT

A fill level sensor for detecting the fill level of a liquid in a container includes an ultrasonic transceiver, an inner tube for arrangement inside the container, the inner tube being arranged above the ultrasonic transceiver such that a liquid present in the container forms a liquid column in the inner tube the level of which can be detected by the ultrasonic transceiver, an outer tube surrounding the inner tube, and a cap which covers the inner tube and the outer tube toward the top. The cap has an inner tubular section adjoining the inner tube, an outer tubular section adjoining the outer tube, an inner vent opening for the inner tubular section and an outer vent opening for the outer tubular section.

12 Claims, 1 Drawing Sheet

FILL LEVEL SENSOR FOR DETECTING THE FILL LEVEL OF A LIQUID IN A CONTAINER

CROSS REFERENCE TO RELATED APPLICATIONS

This is a U.S. national stage of application No. PCT/EP2012/074656, filed on Dec. 6, 2012. Priority is claimed on German Application No. DE102011087981.1 filed Dec. 8, 2011, the content of which is incorporated herein by reference.

BACKGROUND OF THE INVENTION

1. Field of the Invention

The invention relates to a fill level sensor having an ultrasonic transmitter and receiver for detecting the fill level of a liquid in a container.

2. Description of Prior Art

Fill level sensors of this type are used in very diverse applications and for different liquids. Ultrasonic waves are emitted with the aid of the ultrasonic transmitter and are reflected from a boundary surface of the liquid in contact with an adjacent medium. The reflected ultrasonic waves are received by the ultrasonic receiver. By suitable evaluation a fill level of the liquid in the container can be determined, for example on the basis of the transit time of the sound waves. Deformations of the boundary surface caused by movements of the liquid, or foaming on the surface of the liquid, can adversely affect this measuring method. It is therefore known to insert so-called calming tubes within the liquid, which damp the movements of the boundary surface and counteract foaming.

The aforementioned problems occur, in particular, when measuring the fill level of an oil tank in a motor vehicle, since the oil sloshes constantly back and forth in the tank while driving and in addition has a tendency to foam, accentuated in some cases by vibrations of the vehicle. Fill level sensors have therefore become known for use in such oil tanks in motor vehicles, and a detail of this known arrangement is shown in FIG. 4. The fill sensor has an inner tube 18 for arrangement in the oil tank, which inner tube is arranged above the ultrasonic transmitter and receiver. Oil contained in the oil tank forms a liquid column in the inner tube 18 the height of which is detected using the ultrasonic transmitter and receiver. The inner tube 18 is surrounded by an outer tube 20. A cap 22 covers the inner tube 18 and the outer tube 20 towards the top. The inner tube 18 serves to guide the ultrasound. The upper boundary surface of the liquid column in the inner tube 18 in contact with the air above it is effectively calmed by the two tubes 18, 20 arranged one inside the other. In addition, the cap 22 prevents oil from splashing into the inner tube 18 or into the outer tube 20 from above while driving, which further calms the boundary surface and counteracts foaming.

In the known arrangement, the lower ends of the inner tube 18 and of the outer tube 20 are usefully located close to the lowest point of the container. The upper ends of the inner tube 18 and of the outer tube 20, and the cap 22, are located above the highest fill level to be detected. The lengths of the inner tube 18 and of the outer tube 20 must therefore be adapted exactly to the particular application.

SUMMARY OF THE INVENTION

Starting therefrom, it is an object of the invention to make available a fill level sensor that can be adapted more simply and cost-effectively to different applications and installation situations.

This object is achieved by the fill level sensor that serves to detect the fill level of a liquid in a container and comprises
an ultrasonic transmitter and receiver,
an inner tube for arrangement in the container, which inner tube is arranged above the ultrasonic transmitter and receiver in such a way that a liquid located in the container forms a liquid column in the inner tube,
the height of which can be detected using the ultrasonic transmitter and receiver,
an outer tube surrounding the inner tube,
a cap which covers the inner tube and the outer tube towards the top, wherein
the cap comprises an inner tubular section adjoining the inner tube, an outer tubular section adjoining the outer tube, an inner vent opening for the inner tubular section and an outer vent opening for the outer tubular section.

The ultrasonic waves are emitted by the ultrasonic transmitter and pass through the liquid column contained in the inner tube. They are reflected at the upper end of the liquid column, at a boundary surface in contact with the medium located above it, pass through the liquid column again in the opposite direction and are received by the ultrasound receiver. With the aid of a suitable evaluation device, the height of the liquid column can be determined, in particular from the transit time of the ultrasonic waves.

The inner tubular section of the cap adjoins the inner tube towards the top, so that, in the event of a fill level of the liquid above the upper end of the inner tube, the liquid column can extend upwardly beyond this end into the cap. In this case the liquid column is surrounded by the inner tube and by the inner tubular section, and the inner tube and the inner tubular section together effect the desired calming of the boundary surface and guidance of the ultrasonic waves. Because the inner tubular section adjoins the inner tube, with regard to the ultrasound measurement the same conditions are present as with an inner tube of correspondingly longer configuration in conjunction with a conventional cap, which does not have a tubular section. The measuring method, in particular the emission and evaluation of the ultrasound signals, therefore does not need to be changed with respect to the conventional method.

The ultrasonic transmitter and receiver may have a single sound transducer, which is responsible both for converting electrical signals into ultrasonic waves and for converting the reflected ultrasonic waves into electrical signals, and therefore operates as a combined transmitter and receiver.

The inner tube and the outer tube may be cylindrical. They may have a circular, rectangular or polygonal cross section. An annular gap may be formed between the inner tube and the outer tube. In particular, both tubes may be circular-cylindrical and may be arranged concentrically with one another.

The cap is arranged above the inner tube and the outer tube and covers both tubes towards the top. It has an inner tubular section, the cross section of which may correspond to the inner tube in shape and size. In addition, the cap has an outer tubular section, the cross section of which may correspond to the outer tube in shape and size. The two tubular sections adjoin the two aforementioned tubes, such that the interior of the inner tube is continued upwardly by the interior of the inner tubular section. Likewise, the space between the inner tube and the outer tube is continued upwardly by a space between the inner tubular section and the outer tubular section.

In order that the liquid column can form inside the inner tube, there is a connection between the inner chamber of the inner tube and the surrounding interior of the container. This connection may be configured, for example, as a through-opening in the inner tube close to the lower end of the inner tube, for example in a cylindrical wall of the inner tube. Alternatively, a through-opening having this effect may be formed in a housing part adjoining the bottom of the inner tube. Such a through-opening may connect the interior of the inner tube directly to the space between the inner tube and the outer tube.

The interior of the outer tube is in turn connected to the surrounding interior of the container, so that the liquid can flow from the container into the space between the inner tube and the outer tube. For this purpose a through-opening may be formed in the outer tube close to the lower end of the outer tube. Alternatively, a through-opening may be formed in an adjoining housing part.

The inner vent opening of the cap for the inner tubular section ensures that the medium located in the container above the liquid can flow into or escape from the upper tubular section and the inner tube, so that the liquid column in the inner tube and possibly in the adjoining inner tubular section can rise or fall according to the fill level in the container.

The outer vent opening is arranged in such a way that the medium above the liquid can escape from, or flow into, the space between the inner tube and the outer tube, or from or into the adjoining space above it between the inner tubular section and the outer tubular section, so that the liquid level in this region can adapt itself to the fill level of the container.

As a result of the continuation of the inner tube and of the outer tube through the inner tubular section and the outer tubular section of the cap, the overall length of the fill level sensor and its external dimensions, as well as the usable fill level range, with the lengths of the inner tube and the outer tube remaining unchanged, can be adapted solely by changing the length of the inner tubular section and of the outer tubular section of the cap. It is therefore possible, for differently dimensioned fill level sensors, to use only different caps, while the other components, in particular the inner tube and the outer tube, can be used in a standard length. Only a single component therefore needs to be adapted. In addition, this component is relatively compact, so that the manufacturing and tooling costs for a cap with adapted dimensions are substantially lower than the corresponding costs incurred in producing inner and outer tubes of a length exactly adapted to the application while using a conventional cap.

In one embodiment, the length of the inner tubular section and/or of the outer tubular section is greater than the internal diameter of the inner tube. This length may also be greater than the external diameter of the inner tube or than the internal diameter of the outer tube, or the outer diameter thereof. In these cases the inner tubular section and/or the outer tubular section are of considerable length, so that the inner tube and the outer tube are lengthened so far as to yield an increased measuring range. By using a cap with correspondingly long inner and outer tubular sections, the inner tube and the outer tube can be shortened to such an extent that they can be used even in applications requiring very compact fill level sensors. An extensive use of identical parts for very diverse applications is thereby made possible.

In one embodiment, the inner vent opening connects the interior of the inner tubular section to a space between the inner tubular section and the outer tubular section. The space may be in the form of an annular gap, in particular a circular annular gap. Alternatively, the inner vent opening may connect the interior of the tubular section directly to the surrounding interior of the container, for example above the cap. Through the connection to the space effective venting is ensured and, at the same time, further calming of the upper boundary surface of the liquid column is achieved.

In one embodiment, the inner vent opening is formed in a wall of the inner tubular section. The wall may be, for example, cylindrical. An especially simple connection is achieved in this way.

In one embodiment, the internal diameter of the inner tubular section is equal to the internal diameter of the inner tube. In this way, with a corresponding fill level inside the inner tube and inside the inner tubular section, a liquid column having a uniform cross section is formed, favoring propagation of the ultrasonic waves unimpaired by the connection site between the inner tube and the inner tubular section.

In one embodiment, the inner tubular section has, at its lower end, a coupling sleeve into which the upper end of the inner tube is fitted. The coupling sleeve may be formed integrally with the inner tubular section. It forms a longitudinal section which has a larger internal diameter than the inner tubular section. In particular, the internal diameter of the coupling sleeve may be matched to the external diameter of the inner tube, so that the inner tube can be inserted into the coupling sleeve with an exact fit and in an approximately or completely fluid-tight manner. Of course, the inner tube may also be bonded in the coupling sleeve, or connected sealingly thereto in another way, for example with the aid of a seal or by screw connection or welding.

In one embodiment, the coupling sleeve closes a vent opening at the upper end of the inner tube. In the case of conventional sensors such a vent opening, which in conjunction with a conventional cap ensures venting of the inner tube, may be provided at the upper end of the inner tube. If such inner tubes are to be combined with a cap according to the invention, this vent opening should be closed. The venting function is taken over by the inner vent opening in the cap. In the configuration mentioned, the vent opening at the upper end of the inner tube can be closed by the coupling sleeve in a simple manner, without an adaptation of the inner tube being required for this purpose.

In one embodiment, a plug-in connection is formed between the outer tubular section and the outer tube. For example, the outer tubular section may have a further coupling sleeve into which the outer tube can be fitted. An internal diameter of the outer tubular section may also be adapted to an external diameter of the outer tube, or an external diameter of the tubular section may be adapted to an internal diameter of the outer tube, in such a way that the two parts mentioned can be easily fitted into one another. The plug-in connection may be fixed by bonding, welding or screwing. A seal may additionally be provided in order to make the connection fluid-tight.

In one embodiment, the cap is formed in one piece from plastics material. An injection molding process, for example, is suitable for this purpose.

In one embodiment, the ultrasonic transmitter and receiver is arranged in a housing connected to the inner tube and to the outer tube. For this connection the housing may have a receptacle for the inner tube and a receptacle for the outer tube, into which the two tubes can be fitted. The connection between the inner tube and the housing and/or the connection between the outer tube and the housing may be configured in a load-bearing manner, so that the inner tube and/or the outer tube is/are arranged firmly in the container through the connection with the housing. In this way the housing forms a support for the inner tube and the outer tube. The complete fill level sensor comprising the ultrasonic transmitter and receiver in its housing, and the inner tube fastened thereto and the outer tube fastened thereto, may form a preassembled unit, possibly including the cap. This simplifies installation of the fill level sensor in a container.

The above-mentioned object is also achieved by a container having a fill level sensor as described herein. The container and fill level sensor may optionally form a preassembled unit.

In a further embodiment, the container is an oil tank for a motor vehicle, in particular an oil sump.

In one embodiment, the invention is directed at a motor vehicle having a container with a fill level sensor as described herein.

BRIEF DESCRIPTION OF THE DRAWINGS

The invention is explained in detail below with reference to an exemplary embodiment shown in three figures. In the figures.

DETAILED DESCRIPTION OF THE PRESENTLY PREFERRED EMBODIMENTS

Figure 4:
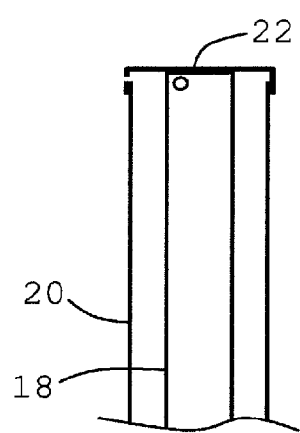
FIG. 4 shows a portion of a fill level sensor according to the prior art in a simplified, schematic representation.

FIG. 4 has already been explained in the background and shows a portion of a fill level sensor according to the prior art.

Figure 1:
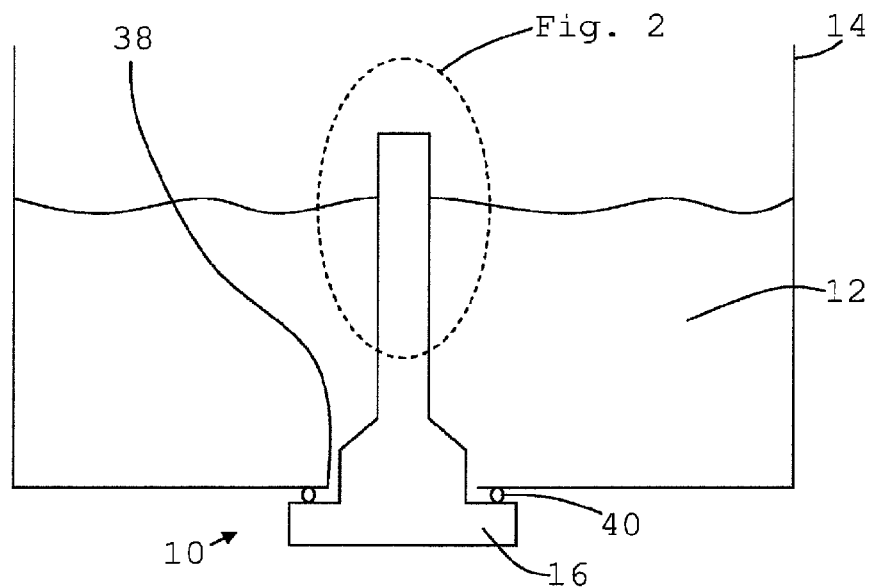
FIG. 1 shows a schematic, simplified cross-sectional view of a fill level sensor according to the invention installed in a container.

FIG. 1 shows a fill level sensor, denoted as a whole by reference 10, which is installed in a container 14. A liquid 12 is located in the container 14.

The fill level sensor 10 has at its lower end an ultrasonic transmitter and receiver 16, which is integrated in a housing. The housing, represented only schematically in the figure, is fitted from below into an opening 38 of the container. A circumferential seal 40 is arranged between the housing and the bottom of the container 14, so that the opening 38 of the container 14 is closed in a fluid-tight manner when the fill level sensor 10 is inserted.

The upper parts of the fill level sensor 10 are arranged inside the container 14 and project upwardly from the liquid in the case of the fill level of the liquid 12 shown. Details of these upper parts can be more clearly seen in FIG. 2.

Figure 2:
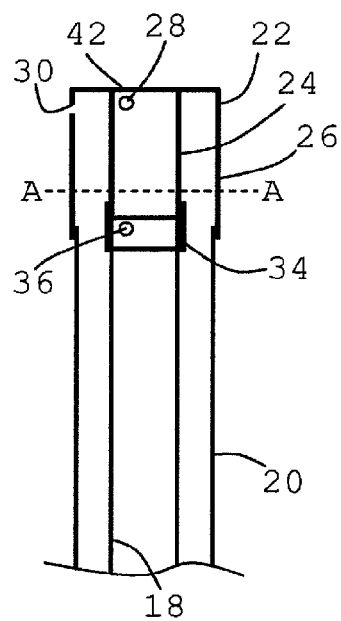
FIG. 2 is a detailed representation of the upper end of the fill level sensor from FIG. 1, also in a simplified, schematic representation.

FIG. 2 shows an inner tube 18 and an outer tube 20 of the fill level sensor 10. The inner tube 18 and the outer tube 20 continue downwardly as far as the housing of the ultrasonic transmitter and receiver 16, openings through which the liquid 12 can flow into the space between the inner tube 18 and the outer tube 20 and into the inner tube 18 being present close to the lower ends of the inner tube 18 and of the outer tube 20. This is not shown in detail in FIG. 2.

FIG. 2 further shows a cap 22, which is formed in one piece from plastics material and has an inner tubular section 24 and an outer tubular section 26. The inner tubular section 24 adjoins the inner tube 18 towards the top. In addition, the inner tubular section 24 has an inner vent opening 28, which is formed in a cylindrical wall close to the upper end of the inner tubular section 24 and connects the interior of this inner tubular section 24 to a space 32 between the inner tubular section 24 and the outer tubular section 26 of the cap 22.

An outer vent opening 30, which connects the space 32 between the inner tubular section 24 and the outer tubular section 26 to the interior of the container 14, is arranged in a wall of the outer tubular section 26, close to the upper end thereof.

The inner tubular section 24 and the outer tubular section 26 project downwardly from a disk-shaped portion 42 of the cap 22, so that both the inner tubular section 24 and the outer tubular section 26 are completely covered at the top by the disk-shaped portion 42.

The internal diameter of the outer tubular section 26 is matched to the external diameter of the outer tube 20 such that the outer tube 20 can be fitted into the inner tubular section 26.

The internal diameter of the inner tubular section 24 corresponds to the internal diameter of the inner tube 18, so that, in the installed state of the cap 22 illustrated, a continuous, smooth cylindrical surface formed by the inner tube 18 and the inner tubular section 24 is produced, favoring unimpaired ultrasound propagation within the liquid column. In addition, a coupling sleeve 34 into which the inner tube 18 is fitted is formed on the inner tubular section 24. For this purpose the internal diameter of the coupling sleeve 34 is matched to the external diameter of the inner tube 18.

FIG. 2 further shows a vent opening 36 at the upper end of the inner tube 18, which vent opening 36 is closed by the coupling sleeve 34.

Figure 3:
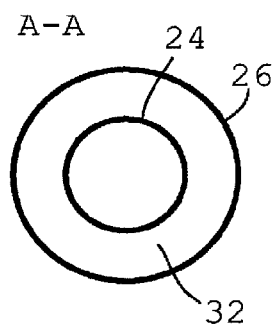
FIG. 3 is a cross-sectional representation of the end cap of the fill level sensor from FIG. 2 along the section plane marked A-A in FIG. 2.

FIG. 3 shows in cross section the concentric arrangement of the inner tubular section 24 and the outer tubular section 26 in the section plane marked A-A in FIG. 2. A space 32 in the form of an annular gap is located between the inner tubular section 24 and the outer tubular section 26.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fill level sensor (10) for detecting the fill level of a liquid (12) in a container (14), comprising:
   an ultrasonic transmitter and receiver (16);
   an inner tube (18) arranged in the container (14), the inner tube (18) being arranged above the ultrasonic transmitter and receiver (16) such that a liquid (12) located in the container (14) forms a liquid column in the inner tube (18), the height of the liquid column being detectable using the ultrasonic transmitter and receiver (16), an upper end of the inner tube (18) having a vent opening (36);
   an outer tube (20) surrounding the inner tube (18); and
   a cap (22) covering the inner tube (18) and the outer tube (20) towards top end of the inner tube and outer tube, the cap (22) having:
      an inner tubular section (24) adjoining the inner tube (18), an outer tubular section (26) adjoining the outer tube (20), an inner vent opening (28) formed in the inner tubular section (24), and an outer vent opening (30) formed in a wall of the outer tubular section (26), wherein the inner tubular section (24) of the cap (22) has, integrally formed at its lower end, a coupling portion into which the upper end of the inner tube (18) is fitted so that the coupling portion of the inner tubular portion (24) closes the vent opening (36) at the upper end of the inner tube (18), the coupling portion forming a longitudinal section having an internal diameter matched to the external diameter of the inner tube (18) so the inner tube can be inserted into the coupling portion in a fluid-tight manner.

2. The fill level sensor (10) as claimed in claim 1, wherein a length of the inner tubular section (24) and/or of the outer tubular section (26) is/are greater than an internal diameter of the inner tube (18).

3. The fill level sensor (10) as claimed in claim 1, wherein the inner vent opening (28) connects the interior of the inner tubular section (24) to a space (32) defined between the inner tubular section (24) and the outer tubular section (26).

4. The fill level sensor (10) as claimed in claim 1, wherein the inner vent opening (28) is formed in a wall of the inner tubular section (24).

5. The fill level sensor (10) as claimed in claim 1, wherein an internal diameter of the inner tubular section (24) is equal to an internal diameter of the inner tube (18).

6. A fill level sensor (10) for detecting the fill level of a liquid (12) in a container (14), comprising:

an ultrasonic transmitter and receiver (16);

an inner tube (18) arranged in the container (14), the inner tube (18) being arranged above the ultrasonic transmitter and receiver (16) such that a liquid (12) located in the container (14) forms a liquid column in the inner tube (18), the height of the liquid column being detectable using the ultrasonic transmitter and receiver (16);

an outer tube (20) surrounding the inner tube (18);

a cap (22) covering the inner tube (18) and the outer tube (20) towards top end of the inner tube and outer tube, the cap (22) having:

an inner tubular section (24) adjoining the inner tube (18), an outer tubular section (26) adjoining the outer tube (20), an inner vent opening (28) formed in the inner tubular section (24), and an outer vent opening (30) formed in a wall of the outer tubular section (26); and a coupling sleeve (34) arranged at a lower end of the inner tubular section (24), wherein the upper end of the inner tube (18) is fitted into the coupling sleeve (34), wherein the coupling sleeve (34) closes a vent opening (36) at the upper end of the inner tube (18).

7. The fill level sensor (10) as claimed in claim 1, further comprising a plug-in connection arranged between the outer tubular section (26) and the outer tube (20).

8. The fill level sensor (10) as claimed in claim 1, wherein the cap (22) is produced in one piece from plastic.

9. The fill level sensor (10) as claimed in claim 1, further comprising a housing connected to the inner tube (18) and to the outer tube (20), wherein the ultrasonic transmitter and receiver (16) is arranged in the housing.

10. A container (14) having a fill level sensor (10) as claimed in claim 1.

11. The container (14) as claimed in claim 10, wherein the container (14) is an oil tank for a motor vehicle.

12. A motor vehicle having a container (14) with a fill level sensor (10) as claimed in claim 10.

\* \* \* \* \*